(12) United States Patent
Young

(10) Patent No.: US 7,806,288 B2
(45) Date of Patent: Oct. 5, 2010

(54) FOLDING DISH

(75) Inventor: Michael Young, Long Island City, NY (US)

(73) Assignee: Progressive International Corporation, Kent, WA (US)

( * ) Notice: Subject to any disclaimer, the term of this patent is extended or adjusted under 35 U.S.C. 154(b) by 372 days.

(21) Appl. No.: 12/036,122

(22) Filed: Feb. 22, 2008

(65) Prior Publication Data

US 2008/0203100 A1 Aug. 28, 2008

Related U.S. Application Data

(60) Provisional application No. 60/891,216, filed on Feb. 22, 2007.

(51) Int. Cl.
*B65D 6/16* (2006.01)
*B65D 8/18* (2006.01)
*B65D 90/02* (2006.01)

(52) U.S. Cl. .................................. 220/666; 220/574
(58) Field of Classification Search ............. 220/4.28, 220/9.2–9.4, 574, 666; 229/117.06
See application file for complete search history.

(56) References Cited

U.S. PATENT DOCUMENTS

| 1,133,050 | A | * | 3/1915 | Mearkle | 220/666 |
| 2,749,956 | A | * | 6/1956 | Eldred | 220/9.3 |
| 5,024,344 | A | * | 6/1991 | Paula | 220/9.3 |
| 5,363,980 | A | * | 11/1994 | Mulcahy | 220/495.07 |

* cited by examiner

*Primary Examiner*—Harry A Grosso
(74) *Attorney, Agent, or Firm*—Black Lowe & Graham, PLLC

(57) ABSTRACT

The invention comprises a dish that can be folded to a compact size for use when camping or traveling. The dish is preferably folded along a central axis via living hinges that allow the dish to be collapsed and held in a collapsed position by snaps or other fasteners. In use, the dish is unfolded and formed into a stable position.

8 Claims, 3 Drawing Sheets

FOLDING DISH

PRIORITY CLAIM

This application claims the benefit of prior U.S. Provisional Patent Application Ser. No. 60/891,216, filed Feb. 22, 2007, contents of which are incorporated herein.

FIELD OF THE INVENTION

This invention relates generally to dishes that are capable of being folded.

BACKGROUND OF THE INVENTION

When traveling, for example as with camping, the traveler may have a wide array of dishes, utensils, and other items to take along. In most cases, these items can be bulky and difficult to pack. This is especially true if the items are to be taken in a backpack such that space is at a premium. This need arises for dishes to be used for both people and their pets. As the prior art does not contain a suitable folding dish, it would be useful to have a dish capable of being folded into a compact size and that can also be used as a pet dish.

SUMMARY OF THE INVENTION

In a preferred form, the invention comprises a dish that can be folded to a compact size for use when camping or traveling. In use, the dish is unfolded and formed into a stable position.

DETAILED DESCRIPTION OF THE PREFERRED EMBODIMENT

Figure 1:
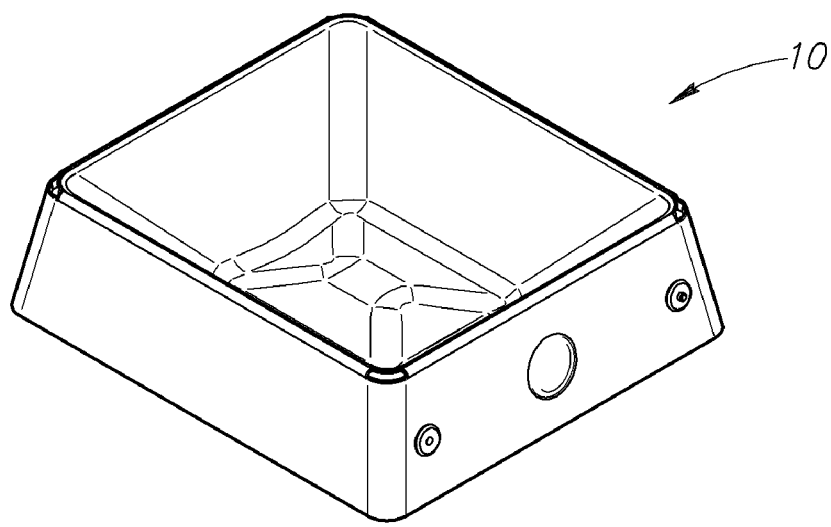
FIG. 1 is a perspective view of a preferred folding dish.

An exemplary bowl 10 is depicted in FIG. 1, which illustrates a perspective view of a preferred folding bowl. The particular example as shown includes a frame 16 and a bowl insert 18, as best seen in the exploded view of FIG. 2.

Ideally, the bowl frame 16 is made from a material that is somewhat rigid, while the bowl insert is made from a more flexible material. In the embodiment as shown, the frame is constructed from polypropylene, while the bowl insert is formed from a thermoplastic elastomer. For either component, a variety of other materials may be suitable, and in the form as illustrated each material is capable of forming a living hinge while providing sufficient rigidity to enable the bowl to retain its shape while in use.

Each of the two principal components, the insert and the frame, are configured to be foldable to a deployed position for use and a folded position for storage. In general, the preferred example of the bowl takes the shape of an inverted truncated four-sided pyramid formed by the four sides 20, 21, 22, 23 of the bowl frame. The bowl insert includes four angled sides and a bottom, with each of the four sides being generally trapezoidal in shape. The bowl insert includes a plurality of downwardly depending tabs or flanges that are sized and configured to fit within mating slots positioned along the top edges of the frame to secure the insert to the frame.

Figure 3:
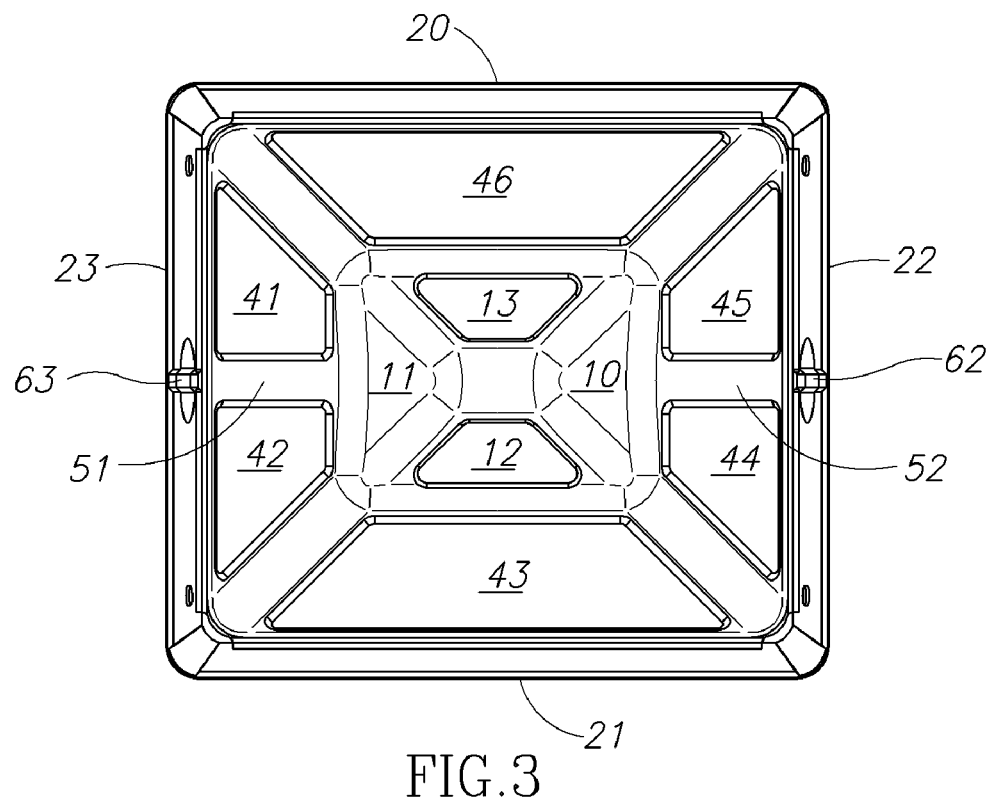
FIG. 3 is a bottom view of a preferred folding dish.

As illustrated in the bottom view of FIG. 3, the bowl insert is formed in a manner that encourages folding along particular lines when a force is exerted along the sides of the bowl. Preferably the top surface of the bowl insert (visible in FIG. 1) has relatively smooth walls while the bottom surface of the bowl insert (visible in FIG. 3) is formed with variations in thickness to facilitate folding. As shown, one pair of opposing sides 22, 23 of the bowl insert include panels 41, 42 and 44, 45 forming a portion of the wall that are relatively thicker than another portion of the side that is relatively thinner. The relatively thinner regions 51, 52 extend down the center of the side of the bowl, from the bottom to the upper rim. In this fashion, the thin region essentially bisects the side of the bowl. As described above, two opposing sides 22, 23 of the bowl insert are formed with such relatively thinner portions in order to form a living hinge that substantially divides the bowl insert in half, allowing the bowl insert to be readily folded along the thinner regions 51, 52.

The remaining two sides of the bowl insert 20, 21—that is, the two sides that are between the folding sides discussed above—do not include relatively thinner sections and are preferably not configured to fold along a living hinge. The panels 43, 46 forming the non-folding sides are preferably about as thick as the panels 41, 42 and 44, 45 described above. Though they may be bent with the application of force, they are relatively less susceptible to bending than the thinner regions 51, 52. In a preferred form, the thickened regions are approximately 2 mm thick while the thinner regions are approximately 0.6 to 0.8 mm thick.

The four sides of the bowl are joined together along four separate edges defining corners of the bowl, with each of the corners beginning at the bottom of the bowl insert and terminating substantially at the rim of the bowl. The edges of the bowl are molded into a shape, as shown, that will naturally produce a tendency to further fold along the edges when appropriate force is applied.

Figure 4:
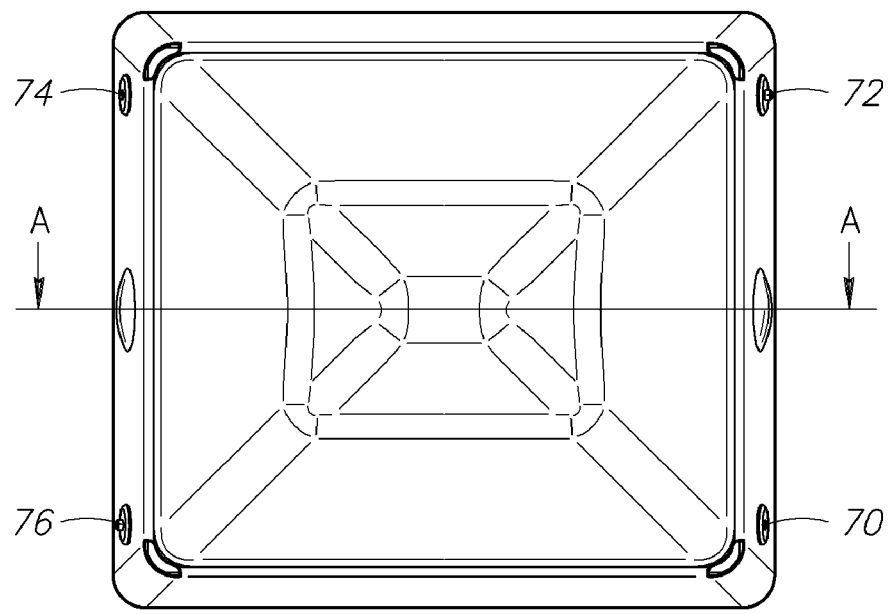
FIG. 4 is a top view of a preferred folding dish.

As seen in FIG. 4, the bowl is formed to produce a plurality of natural folding lines. As discussed above, a first set of folding lines is produced along line A-A, bisecting the two opposing sides of the bowl insert through the thinner regions 51, 52. A further set of folding lines extends along each of the four corners of the bowl.

As shown, the bottom of the bowl is molded with a slightly raised floor in a configuration that will encourage folding along desired lines. The floor is raised in a shallow, generally pyramidal shape defined by four primary panels. Two of the four panels are preferably triangular in shape (panels 10 and 11 in FIG. 3), while two of the panels are preferably trapezoidal in shape (panels 12 and 13 in FIG. 3). As shown in FIG. 3, the trapezoidal panels 12, 13 are relatively thicker and therefore relatively more resistant to bending. The triangular panels 10, 11 are thinner and more susceptible to bending upon application of a folding force. The raised pyramid shape also urges the bowl floor to fold along the edges of the joined panels, including a line defined by the joined apexes of the trapezoidal sides (that is, the bisecting line A-A in FIG. 4). The trapezoidal portions of the raised floor are preferably thickened or reinforced in panels on the lower surface to stiffen that portion of the floor and further encourage folding along the edges defined by the adjoining trapezoidal and triangular floor sections. In alternate embodiments, the thickened regions may be on the top surface.

Because of the molding configuration of the various panels, raised regions, and thin regions, when an inward force is applied at each of the sides corresponding to the trapezoidal floor panels (that is, sides 20, 21 in FIG. 3) to urge the sides together, the bowl insert will fold along the folding lines described above to substantially flatten the bowl insert.

Figure 2:
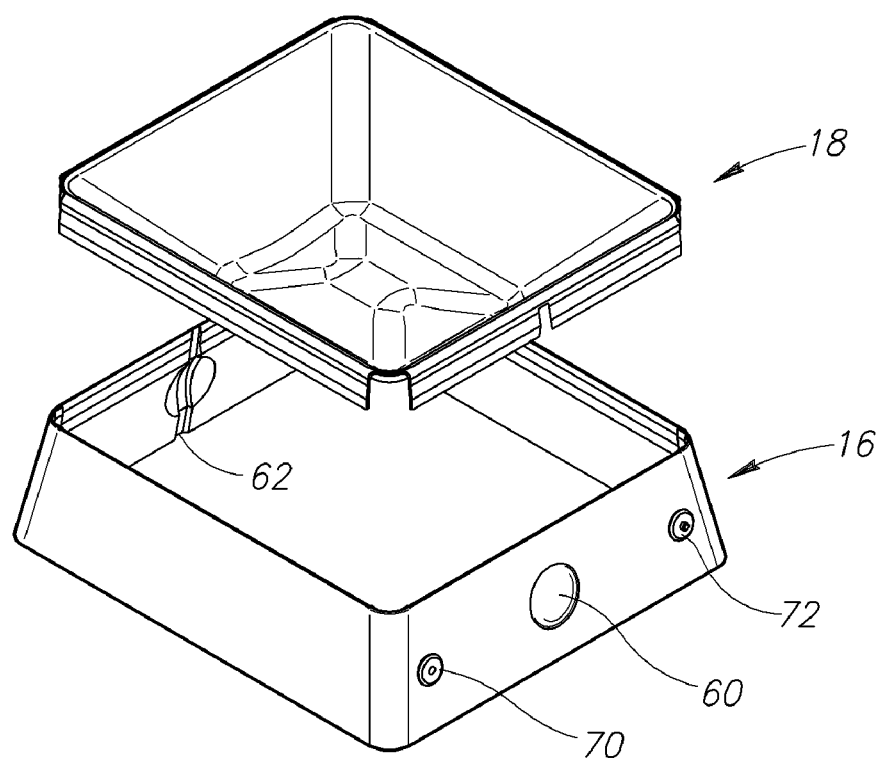
FIG. 2 is an exploded view of a preferred folding dish.

The bowl frame also includes a living hinge 62, 63 formed on each of two opposing sides of the frame. The living hinge is configured to provide a thin and weakened section of material extending substantially vertically along each of two opposing portions of the frame. As seen in FIG. 2, the thinned section of the frame 62 is provided on an inner wall of the frame and is generally adjacent the thinned section of the adjacent insert wall of the insert. Thus, the living hinges configured on each of the two opposing walls of the frame form a line that intersects the folding line depicted by line A-A in FIG. 4. Accordingly, the force applied on opposing sides 20, 21 of the bowl will cause the bowl frame to fold at each of the two living hinges 62, 63 to substantially flatten the frame 16 while substantially flattening the bowl insert 18 at the same time.

Figure 5:
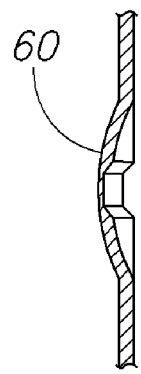
FIG. 5 is sectional view along line C-C in FIG. 6.
Figure 6:
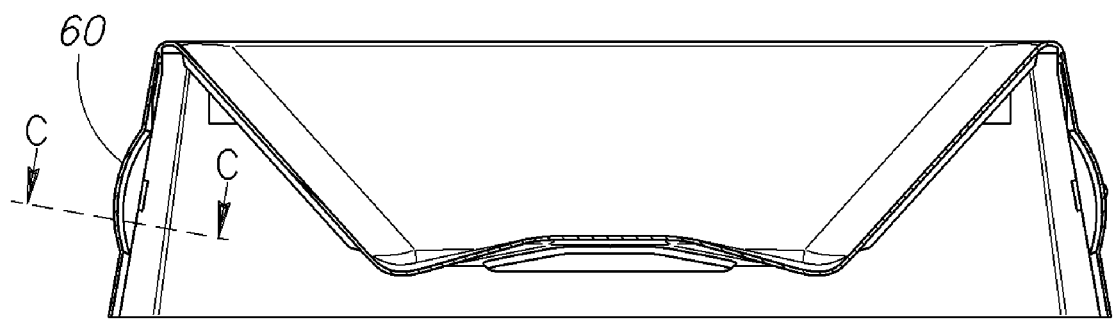
FIG. 6 is a sectional view along line A-A in FIG. 4.

An outer region of the bowl frame overlying the living hinge includes a raised dome 60, as seen in FIG. 2 and the cross-sectional illustration of FIG. 5 taken along line C-C from FIG. 6. The formed raised section will help to urge the side of the frame into a relatively straight and aligned position when it is unfolded. The dome 60 is integrally formed in the side of the frame. Though shown as a circular shape, it may be formed in other shapes in other examples of the invention.

The opposing sides of the frame containing the raised domes and living hinges also each include a pair of mating fasteners 70, 72 and 74, 76. In the example as shown, the mating fasteners take the form of complementary snap buttons. When the bowl is folded in a flat configuration, the fasteners are brought together to hold the bowl in the flat position, such that a first snap 70 mates with a complementary second snap 72 while a third snap 74 mates with a complementary fourth snap 76. A variety of other fasteners such as hooks, ties, hook-and-loop, or others may also be used. Likewise, fasteners may be provided in other locations to hold the bowl in a flattened position.

In order to flatten the bowl, an inward force is applied at each of the raised domes 62, 63, causing the sides 22, 23 to fold inward at the center while adjoining sides 20, 21 are pulled toward one another. Once the fasteners are brought in contact with one another the bowl is held in a flattened position. To use the bowl, the fasteners are disengaged and the bowl is re-formed.

In a preferred form of the invention, the bowl insert is formed from TPE that is over-molded onto the polypropylene frame. In other embodiments, the bowl and frame may be separable, or may be formed from the same material.

Ideally, the insert floor is formed so that it is relatively flexible and can be flattened by the weight of food placed within the bowl. The flattening of the bowl by contents within the bowl will help to prevent the bowl from being inadvertently flattened (wholly or partially) while in use.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

I claim:

1. A folding dish, comprising:
   a frame having upwardly extending sidewalls, the frame having a first location and an opposing second location, the first and second locations being relatively more susceptible to bending than other locations on the sidewalls, wherein the first location and second location each comprise a living hinge;
   a floor secured to the frame;
   a fastener secured to the frame, the fastener being configured to secure the frame in a relatively flattened position when the sidewalls are folded along the first location and the second location;
   wherein the upwardly extending sidewalls further comprise a first pair of opposing sidewalls and a second pair of opposing sidewalls, the first and second pairs of opposing sidewalls being joined to form four corners, the first location being on a first one of the first pair of opposing sidewalls and the second location being on a second one of the first pair of opposing sidewalls; and
   a means for urging each of the first pair of opposing sidewalls into an unfolded position.

2. The folding dish of claim 1, wherein the means for urging comprises a first raised dome on an exterior surface of the first location and a second raised dome on an exterior surface of the second location.

3. The folding dish of claim 1, wherein the frame further comprises an upper perimeter and the floor is secured to the frame adjacent the upper perimeter.

4. A folding dish, comprising:
   a frame having upwardly extending sidewalls, the frame having a first location and an opposing second location, the first and second locations being relatively more susceptible to bending than other locations on the sidewalls;
   a floor secured to the frame;
   the frame further comprising an upper perimeter and the floor being secured to the frame adjacent the upper perimeter, the floor having first, second, third, and fourth surfaces extending downward from the upper perimeter of the frame, wherein the first surface and the third surface are adjacent a respective one of the first pair of opposing sidewalls, the first surface and third surface each having a living hinge;
   a fastener secured to the frame, the fastener being configured to secure the frame in a relatively flattened position when the sidewalls are folded along the first location and the second location;
   wherein the upwardly extending sidewalls further comprise a first pair of opposing sidewalls and a second pair of opposing sidewalls, the first and second pairs of opposing sidewalls being joined to form four corners, the first location being on a first one of the first pair of opposing sidewalls and the second location being on a second one of the first pair of opposing sidewalls; and
   wherein the first, second, third, and fourth surfaces terminate at a base of a shallow pyramid forming a central portion of a bottom of the floor.

5. The folding dish of claim 4, wherein the pyramid further comprises two opposing substantially triangular sides and two opposing substantially trapezoidal sides, the triangular sides having an apex axially aligned with the first location and the second location such that the pyramid will bend substantially at the apexes of the triangular sides upon application of the inward force.

6. The folding dish of claim 4, wherein the frame is relatively more rigid than the floor.

7. A folding dish, comprising:
   a frame having first, second, third, and fourth upwardly extending sidewalls forming a rectangle, the first sidewall opposing the third sidewall and the second sidewall opposing the fourth sidewall to form four corners the first sidewall having a first living hinge at a location substantially at a midpoint of the first sidewall, the third sidewall having a second living hinge at a location substantially at a midpoint of the third sidewall, the frame further being configured to bend at each of the four corners;

an interior floor secured to the frame, the interior floor extending downward from an upper perimeter of the frame; and a pair of fasteners secured to the frame, the fasteners being configured to secure the frame in a relatively flattened position, the pair of fasteners further comprising a first pair of mating snaps on the first sidewall and a second pair of mating snaps on the third sidewall; and a means for urging each of the first pair of opposing sidewalls into an unfolded position.

8. The folding dish of claim 7, wherein the means for urging comprises a first raised dome on an exterior surface of the first location and a second raised dome on an exterior surface of the second location.

* * * * *